O. Z. BREWER.
TIMING MECHANISM.
APPLICATION FILED JAN. 29, 1920.
1,378,318.
Patented May 17, 1921.
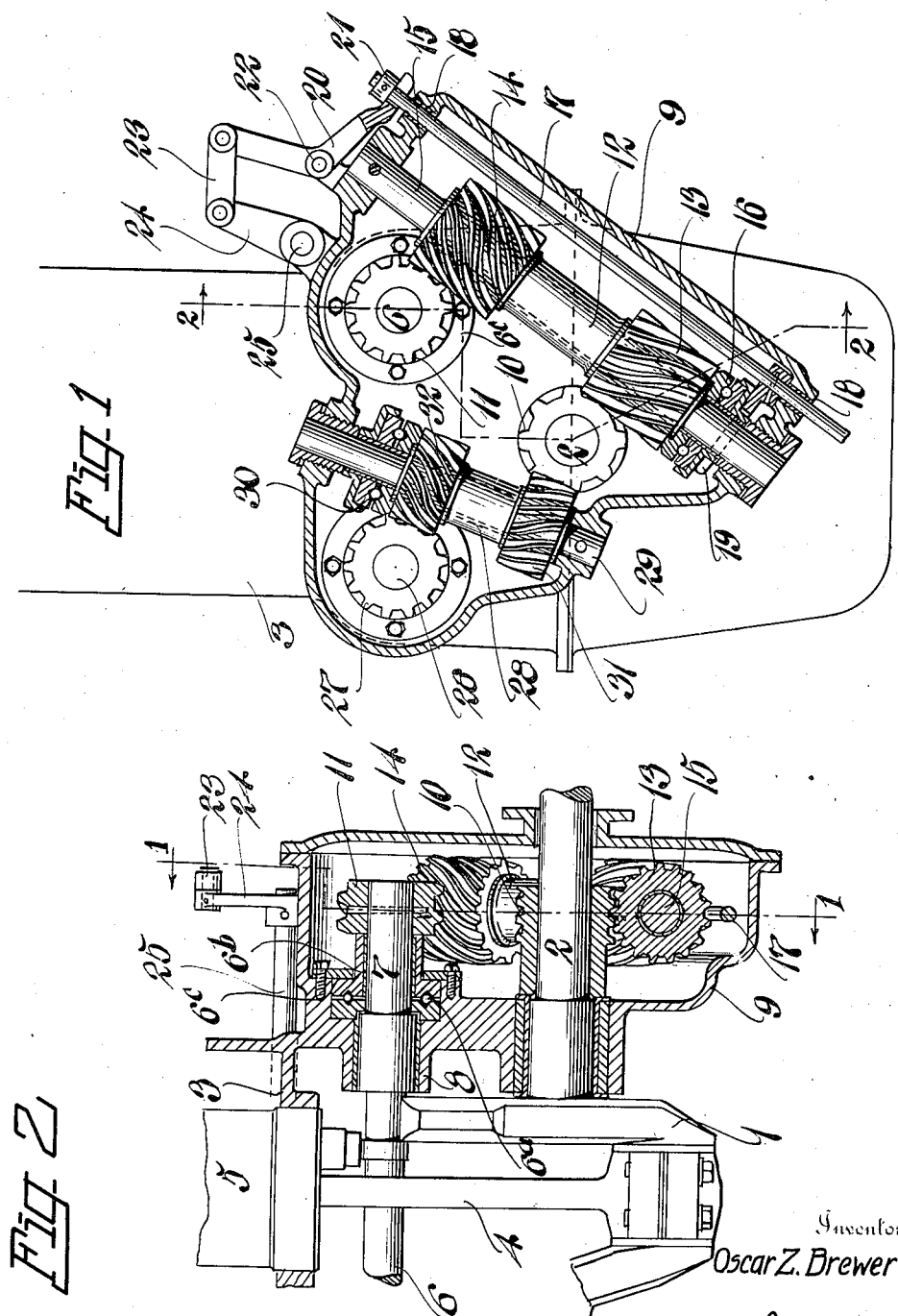
Inventor
Oscar Z. Brewer
By Herbert E. Smith
Attorney

UNITED STATES PATENT OFFICE.

OSCAR Z. BREWER, OF SPOKANE, WASHINGTON.

TIMING MECHANISM.

1,378,318.  Specification of Letters Patent.  Patented May 17, 1921.

Application filed January 29, 1920. Serial No. 354,763.

*To all whom it may concern:*

Be it known that I, OSCAR Z. BREWER, a citizen of the United States, residing at Spokane, in the county of Spokane and State of Washington, have invented certain new and useful Improvements in Timing Mechanisms, of which the following is a specification.

The present invention relates to an improved timing mechanism for valve operating mechanism of internal combustion engines of the four cycle type, by means of which the action of the exhaust valve is altered in relation to the inlet valve to the cylinder through the interposition of worm gearing between the crank or engine shaft and the operating shafts for the respective inlet and exhaust valves, whereby the peripheral position of the exhaust valve shaft is changed in its relation to the driving or crank shaft. This alteration is accomplished during the suspension of operation of the ignition system for the cylinders of the engine, but the unexploded fuel charge is utilized in the cylinders of the engine, and as a result of retarding the action of the exhaust valve with relation to the inlet valve, two compression strokes, *i. e.*, the second and fourth of the cycle, are provided for the charge of fuel gas, and through the medium of this compression a braking action is produced by the action of the piston in the cylinder to retard the movement of the engine, and thus positively retard, as with a braking action, the movement of a motor vehicle to which the engine may be applied for propulsion.

The change in the peripheral relation of the exhaust valve shaft and the crank shaft to alter the timing of the valves is accomplished through worm gearing that may be manually shifted by mechanism operated from the steering mechanism of the motor vehicle, as set forth in a contemporary application for patent filed by me December 4th, 1919, Serial No. 342,482, and which illustrates the broad principles of the present invention.

In the accompanying drawings I have illustrated the worm gearing and connections in conjunction with the crank shaft of the engine and the inlet and exhaust valve operating shafts, according to the best mode I have so far devised for the practical application of the principles of the invention.

Figure 1 is a view showing the gear casing and some parts of the gearing in section, and other parts in elevation, as on line 1—1 of Fig. 2.

Fig. 2 is a sectional view on line 2—2 of Fig. 1, taken at right angles to Fig. 1.

In the adaptation of the valve operating mechanism of internal combustion engines for use with my invention the usual crank shaft or engine shaft 1 is provided with an extension journal 2, the shaft being properly supported in the engine casing 3, and the connecting rod 4 and a piston 5 are illustrated in order that the relation of parts may be better understood. The usual exhaust valve, cam, operating shaft 6 has an extension journal 7, and the necessary bearings for the shafts are indicated at 8, the gearing being incased or inclosed in the gear casing 9 that is suitably attached to the engine casing 3, in convenient position.

By means of the driving worm wheel 10 fixed on the extension 2 of the crank shaft and revolving therewith, the driven worm wheel 11 on the exhaust valve operating shaft 6 is revolved through the interposition of a slide sleeve 12, whose respective integral worms 13 and 14 engage the worm wheels 10 and 11. The threads of the worms 13 and 14 it will be noted extend in reverse direction on the sleeve, and these two worms are of the same diameter as the two driving and driven worm wheels 10 and 11 on the crank shaft and exhaust shaft respectively.

The slide sleeve 12 is disposed obliquely in the gear casing and is movably supported on a fixed axle 15 in the form of a rod or circular bar rigidly fixed in bosses in the casing, and while the threads 13 and 14 of the sleeve are at all times in mesh with their respective wheels 10 and 11, the sleeve is capable of being moved in order that the relation of the two shafts 2 and 6 may be altered as will be described. At the lower end of the sleeve a thrust bearing of the ball bearing type, as 16 is provided, the bearing being slidable or movable on the axle with the sleeve, and the bearing and sleeve are capable of being lifted bodily through the instrumentality of mechanism including a lift rod 17, located parallel with the sleeve and slidable in bearings 18 in the gear casing. At the lower end of the lift rod a forked arm 19 is rigidly fixed and extends at right angles from the rod past the axle and beneath the thrust bearing for the sleeve, and by means of the forked, bell crank lever 20 engaged under the collar 21 fixed on the end of the rod outside the casing, the rod, bearing and sleeve may be lifted with a sliding movement on the axle while the oppositely disposed threads 13 and 14 are in mesh with their wheels 10 and 11.

The bell crank lever is pivoted on the outside of the casing in bearings at 22, and a pivoted link 23 connects the lever with a rock arm 24 on the rock shaft 25, which latter may be oscillated or rocked by suitable mechanism as heretofore referred to located conveniently at the front of an automobile or in other suitable position. By means of the worm gearing thus described the exhaust valve operating shaft is actuated in normal condition.

The usual type of inlet valve operating shaft 26 is revolved in synchronism, under normal conditions with the exhaust valve operating shaft 6 from the crank shaft or engine shaft 2, the shaft 26 being projected into the gear casing to receive the driven worm wheel 27 rigid to revolve therewith, and operative driving gears connect the driving worm wheel with the driven worm gear on the inlet or fuel charge valve shaft as follows. A sleeve 28 is located obliquely between the crank shaft and inlet valve shaft, being supported to revolve freely on the fixed axle 29 supported in the gear casing, a thrust bearing 30 of the ball bearing type being provided near the upper end of the sleeve to resist strains and insure smooth running of the sleeve, which latter is fashioned with a pair of spaced, oppositely threaded worms 31 and 32 engaging respectively the driving worm gear 10 and the driven gear 27. The gears 10, 31, 32 and 27 are of the same diameter, and the gear 27 and its shaft 26 are revolved at one half speed of the crank shaft and its gear 10, the speed of these two shafts being at all times uniform, while the invention contemplates only a variation of the relation between the crank shaft and the exhaust valve shaft 6, not as to speed, but in their peripheral relation one to another, in order to vary the action of the timing mechanism of the exhaust valve with that of the fuel inlet valve.

In Fig. 2 it will be noted that the cam shaft 6 is provided with a thrust bearing 6ª comprising the flanged sleeve 6ᵇ on the shaft and the retaining plate 6ᶜ fixed to the gear casing, to resist end thrust of the shaft due to the engagement of the worm gears 14 and 11.

Under ordinary conditions, the operating mechanism for both inlet and exhaust valves is actuated from the crank shaft in usual manner, but when the timing action of the valves is to be altered in order to retard the progress of an automobile by compression in the cylinders of the fuel charge, the ignition system is suspended, but the supply of gas to engine cylinders is continued.

In the operation of the device of my invention, assuming that the crank shaft is stationary for purposes of explanation, then by lifting rod 17 by mechanism actuated from the driver's seat, the sleeve 12 is shifted on its axle, carrying with it of course the oppositely threaded worm gears 13 and 14, and gear 13 is turned due to the engagement of the spirally arranged threads between worm gears 13 and 10. Worm gear 14 is also turned through an angle of the same degree, and as a consequence, gear 14 turns gear 11 and its shaft 6. This turning of shaft 6 is due to the combination of longitudinal shifting and rotary movement of the sleeve and its end worms, with the result that the shaft 6 is advanced with relation to shaft 2 in the direction it would turn were the mechanism running or operating. The proportions of the gears are such that one turn of the gear sleeve is effected by two revolutions of the gear 10, and one turn of gear 11 is effected by one turn of gear 14, all these gears being of the same pitch and diameter.

The members are so arranged that gear 11 may be turned through an angle subtended by an arc on its pitch circle equal to one and one half times the distance the lift fork or arm 19 is moved. And the rack action of gear 14 turns gear 11 through an angle subtended by an arc on its pitch circle equal to once the distance moved by the fork or arm 19. The turning action produced by the shifting sleeve revolves the sleeve and its worm gears 13 and 14 through an angle equal to one half the angle subtended by an arc on the pitch circle of the gear 10 equal to the distance fork 19 is moved. Therefore since the ratio of gears 14 to 11 is one to one, gear 11 will be turned through the same angle subtended by an arc on its pitch circle equal to the distance moved by the fork 19, plus one half the angle subtended by an arc on pitch circle of gear 11 equal to the distance the arm 19 is moved.

From the above description taken in connection with my drawings it is obvious that I have provided a mechanism for performing its required functions and attaining the desired results in an efficient and reliable manner.

What I claim is—

1. The combination with the crank shaft and the exhaust valve operating shaft having driving and driven members thereon, a shiftable sleeve having geared connection with said members for the purpose described, an inclosing gear case, a fixed axle supporting the sleeve, a thrust bearing for the sleeve, and means for bodily shifting said bearing and sleeve.

2. The combination with the driving and driven shafts having geared members, of a shiftable sleeve and its supporting axle and geared connection between said sleeve and members, an inclosing gear case, a shifting rod supported in the case, a thrust bearing for the sleeve on the axle, and a lift arm on said rod for bodily shifting said bearing and sleeve, for the purpose described.

In testimony whereof I affix my signature.

OSCAR Z. BREWER.